United States Patent Office 3,764,359
Patented Oct. 9, 1973

3,764,359
CATIONIC AQUEOUS BITUMINOUS-AGGREGATE SLURRIES
Jack N. Dybalski, Chicago, Ill., assignor to Akzona Incorporated, Asheville, N.C.
No Drawing. Continuation-in-part of application Ser. No. 552,430, May 24, 1966, which is a continuation-in-part of application Ser. No. 346,113, Feb. 20, 1964, which in turn is a continuation-in-part of application Ser. No. 234,858, Nov. 1, 1962, all now abandoned. This application May 21, 1968, Ser. No. 730,906
Int. Cl. C08h 13/00; C08j 1/46; C09d 3/24
U.S. Cl. 106—280   1 Claim

ABSTRACT OF THE DISCLOSURE

Cationic aqueous bituminous emulsions of the oil in water type-aggregate slurries capable of being worked, containing a mono-quaternary and/or di-quaternary ammonium emulsifier for the bitumen. Such slurry compositions of light color may be pigmented. The slurry compositions are useful as coatings for roads, driveways, parking lots, playgrounds, tennis courts, runways, levees and holding pits.

CROSS-REFERENCES TO RELATED APPLICATIONS

This application is a continuation-in-part of my copending application Ser. No. 552,430, filed May 24, 1966, now abandoned, which is a continuation-in-part of my application Ser. No. 346,113, filed Feb. 20, 1964, which is a continuation-in-part of my application Ser. No. 234,858, filed Nov. 1, 1962, the latter two now abandoned.

BACKGROUND OF THE INVENTION

Bituminous materials have found widespread use in paving and repair of existing road and other paved, bricked, concrete block surfaces and the like. In past practice, bituminous binder material, in a liquid state, a solvent solution or emulsified with water, has been used with aggregate which has been mixed with the bituminous binder material and then applied on to the surface to be coated.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such admixture with aggregate, the aqueous emulsion form of the bituminous material has been generally preferred because it is less hazardous and more economical to use than molten or solvent solutions. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

For example, anionic aqueous emulsions are highly dependent upon climatic conditions. Bituminous emulsions formulated using anionic emulsifiers "break" when the water content falls below a certain level, as will occur due to evaporation and absorption of water by aggregate materials. Thus, the setting or depositing of such emulsions may require a considerable time and will tend to be rather variable. Various agents have been found useful to induce "breaking" of the anionic bituminous emulsion to hasten the depositing of bitumen from such systems. Under field conditions of use, it has been found that if a humid or cold environment exists, evaporation into the atmosphere or absorption by the soil of the water phase is inhibited and the emulsion tends to break very slowly. This weakens the resultant coat which remains soft and in a flowable condition. As such, it is easily washed away before the binder has had a chance to adhere to the mineral surface. Even after adherence has been obtained after long lapse of time, poor bonding of the bitumen to aggregate material permits further stripping of the bituminous material from the aggregate.

More recently, cationic bituminous emulsions have come into use and obviate many of the disadvantages of the anionic emulsions. In contrast to the anionic emulsions, bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is mixed with the emulsions, the emulsions applied to the aggregate, or aggregate applied to emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Prior to this invention satisfactory cationic aqueous bituminous-aggregate slurries have not, to my knowledge, been obtained.

Accordingly, an object of this invention is to provide a novel mixture of fine-grained aggregate and bituminous emulsion.

A further object is to provide a mixture of the above character which is workable.

Another object is to provide a mixture of cationic bituminous emulsion and fine-grained aggregate whose viscosity or fluidity can be varied by the user at the site of use.

Another object is to provide a bituminous fine-grained aggregate mixture which deposits at a fairly rapid rate after being applied to the surface to be treated, and is workable for a period of time long enough to enable application in slurry form.

Still another object is to provide a pigmented cationic aqueous bituminous emulsion fine-grained aggregate slurry system.

Cationic bituminous emulsions have now been found which not only can be mixed with aggregate to form a workable slurry but are also relatively quick-setting. As a result of these normally inconsistent characteristics, such a composition can be deposited onto a roadbed using a spreader box, or applied with a pneumatic device to a vertical wall as a stucco coat, or to a roof as a weatherproof coat with little or no waste by reason of drippage, splatter or flow. The emulsion broadly comprises bitumen, water, a slurrying agent comprising a quaternary cationic emulsifying agent containing at least one quaternary nitrogen such as the alkyl and the alkyl polyethoxylated quaternary and diquaternary ammonium compounds. The quaternary emulsifying agents are preferably employed as the sole or at least the primary emulsifying agent. However, sometimes they can be advantageously employed in conjunction with a non-ionic surfactant selected from the group consisting of the alkoxylated alkyl aryl alcohols, the alkoxylated alkyl aryloxy alkanols and polyols, and the alkoxylated alkyl esters and amides. The alkyl group of each non-ionic is an aliphatic hydrocarbon containing from 8 to 22 carbons. Modifiers, such as stabilizers, and the like, may also be incorporated into the emulsion composition.

A typical cationic aqueous bituminous emulsion aggregate slurry is formulated in the laboratory with an amount of fine-grained aggregate pre-wetted with water and admixed with a suitable cationic bituminous emulsion to a desired consistency. Suitable consistency is obtained by using mixed gradations of fine-grained aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water and emulsion components may be used. A typical unit is equipped with separate tanks for aggregate, water and emulsion which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the cationic bituminous aggregate slurries of my invention.

The slurry of this invention broadly comprises fine-grained aggregate and a bituminous emulsion made up of bitumen, water, and a mono- or poly-quaternary cationic emulsifier. The emulsifier may be described more fully as a water-soluble quaternary ammonium compound containing at least one quaternary group and at least one aliphatic hydrocarbon group having from 12 to 22 carbon atoms. Such hydrocarbon groups having from 16 to 18 carbons are especially preferred. For example, the emulsifier may be selected from the group consisting of the alkyl and alkyl polyalkoxylated quaternary and diquaternary ammonium compounds. The quaternary emulsifier is water-soluble for promoting the formation of an oil-in-water emulsion. The resulting slurries are mixtures of bitumen and fine-grained aggregate as the dispersed phase in water as the continuous phase. While the slurry remains workable a large proportion of the emulsified bitumen will remain in the aqueous phase without coalescing with the aggregate particles. These results may be obtained with particular advantage when the emulsifier is a water-soluble quaternary compound containing two quaternary nitrogen groups and one aliphatic hydrocarbon group having from 12 to 22 carbon atoms.

The following quaternary cationic emulsifiers are suitable in the present invention:

(1) The alkyl and alkyl polyalkoxylated quaternary ammonium compounds represented by the formula

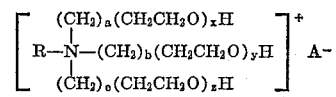

wherein R is an aliphatic hydrocarbon containing from 12 to 22 carbons, $a$, $b$, and $c$ are integers of from 1 to 2 when the corresponding $x$, $y$, or $z$ is 0, $x$, $y$, and $z$ are integers of from 1 to 4 when the corresponding $a$, $b$, or $c$ is 0, with the total of $x$, $y$, and $z$ not exceeding 10, or preferably 5, and A is an anion, such as $NO_3^-$, $Cl^-$, $Br^-$, or $OH^-$, the valency of the anion being equal to the number of cationic quaternary groups.

(a) The alkyl and alkyl polyalkoxylated diquaternary ammonium compounds illustrated by the general formula

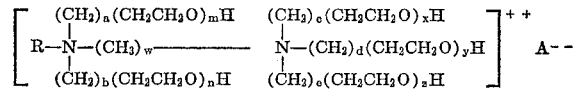

wherein R is an aliphatic hydrocarbon containing from 12 to 22 carbons, $a$, $b$, $c$, $d$, and $e$ are integers of from 1 to 2 when the corresponding $m$, $n$, $x$, $y$, or $z$ is 0, $m$, $n$, $x$, $y$, and $z$ are integers of from 1 to 5 when the corresponding $a$, $b$, $c$, $d$ or $e$ is 0, with the total of $m$, $n$, $x$, $y$, and $z$ not exceeding 15, and preferably 8, $w$ is an integer of from 2 to 4, and A is one or more anions such as $SO_4^{--}$, $NO_3^-$, $Cl^-$, $Br^-$, or $OH^-$, the number of anions providing valences equal to the quaternary cations.

Diquaternaries where the R group contains 16 to 18 carbon atoms are especially desirable. For example, the aliphatic group may be the residues of stearic, palmitic or oleic acids, or mixtures of such residues, as may be derived from natural sources, such as tallow. For the ethoxylated quaternaries, it will usually be most advantageous for the mono-quaternaries to contain 3 moles or less and the diquaternaries 5 moles or less of the ethoxy groups.

Specific emulsifiers which are particularly desirable are: tallow trimethyl ammonium chloride, oleyl trimethyl ammonium chloride, and ethoxylated derivatives of these compounds formed from two moles of ethylene oxide per mole of quaternary. A specific preferred diquaternary is N-tallow N,N-dimethyl N',N',N'-trimethyl 1,3-propylene diamonium chloride. Mixtures of the mono-quaternary ammonium compounds and diquaternary ammonium compounds may be used as well as mixtures of different quaternary ammonium compounds within the above formulas.

The amount of the quaternary cationic emulsifier employed in the aqueous emulsion of this invention may range from about 0.01% to about 2.0% based on the weight of the emulsion, with amounts of about 0.5% to about 1.5% being preferred. If a non-ionic emulsifier is employed in combination with the quaternary, the quantity of the quaternary may be correspondingly reduced. However, it is preferred that at least equal parts by weight of the quaternary emulsifier be employed per part of the non-ionic emulsifier.

Minor amounts of certain non-ionic emulsifiers or modifiers may be used in combination with these cationic emulsifiers. These include: (a) the alkoxylated alkylphenols; (b) the alkoxylated alkylphenoxy alkanols; (c) the alkoxylated alkylphenoxy polyols; (d) the alkoxylated alkyl polyol esters; and (e) the alkoxylated alkyl amides.

All of these non-ionic modifiers or emulsifiers contain a fatty aliphatic hydrocarbon radical having from 8 to 22 carbons, and preferably mixtures of these radicals as contained in tallow, soybean oil, coconut oil, cottonseed oil, tall oil, rosin, and the like.

Certain refinements in the emulsion composition described are also desirable. For example, storage stability of the emulsion prior to admixture with the aggregate may be enhanced by the addition of a modifying agent, specifically a minor proportion of an alkali metal or alkaline earth metal salt; such as calcium chloride or sodium chloride. The amount of stabilizer used may vary from about 0.01% to about 5.0% based on the weight of the emulsion, with from about 0.1% to about 1.0% being preferred. Other modifications known to the trade to enhance the storability, handling, appearance or use of the emulsion or the slurry are also obviously possible.

It is essential that the major portion of the emulsifier be a quaternary or diquaternary ammonium compound as described above. I have found that other commonly used cationic emulsifiers are not suitable for formation of aqueous cationic bituminous fine-grained aggregate slurries. For example, 20 grams of a cationic asphalt emulsion prepared by methods well known in the art and containing 65% asphalt, 35% water and 0.75% N-tallow trimethylenediamine hydrochloride was added to 100 grams of concrete sand (100% passing a #8 mesh screen), prewetted with 10 grams of water. The aqueous cationic emulsion and aggregate formed a lumpy plastic mass within thirty seconds. Such composition was completely unsuitable for application as a resurfacing material. When the same amounts were used except substituting N-tallow-N,N,N',N',N' - pentamethyl, 1,3-propylene diquaternary dichloride for the diamine emulsifying agent, a bituminous-aggregate slurry was formed which was workable for at least three minutes and readily spread into a thin (⅛ inch thick) coating for road resurfacing.

The "bitumen" or "bituminous binder" used in the emulsion may be derived from Venezuelan, Midcontinent, Western and other sources and includes bitumen, natural asphalt, petroleum oil, still residues of paving grade, plastic residues from coal tar distillation, petroleum pitch, petroleum resins, coumarone-indene resins, plastic-modified petroleum resins, solutions of such substances like cut-back asphalt, and the like. About 65% by weight of bituminous binder is used in the emulison, the preferred range being 50 to 70%. Synthetic resins may be used in conjunction with the above bituminous materials in minor amounts up to about 30% of the bitumen. Suitable synthetic resins include acrylics, alkyds, phenolics, polyethylene, polyisobutene, polypropylene, polyvinyl chloride, polyvinyl acetate, polyurethane, polyesters and epoxy-polyamide blends.

The fine-grained aggregate may comprise one or more of the igneous, sedimentary or metamorphic types of rock, such as gravel, silica gravel, limestone, granite, sandstone, chert, traprock, slag and quartz. About 50 to 80% of aggregate based on the weight of the resultant slurry should be used. At least 80% by weight of the fine-grained aggregate should pass a 8 mesh screen (American Standard Screen Size). Usually, the bulk of the aggregate material, up to 90% or more, will range from 8 mesh to 200 mesh. Aggregate which has been water-washed and classified by mesh size is preferred. It is well recognized in the art that the term "fine-grained aggregate" applies to all material passing the number 8 sieve. Thus, it is seen that the fine-grained aggregate used in this invention is of an entirely different character than the coarse aggregates used in paving, and even very different from mixtures of coarser aggregates which contain a small proportion of material which passes a #8 sieve. It is readily apparent that coarse aggregates which are retained on a #8 sieve are not suitable to form the slurries of my invention since they cannot be maintained in a slurry state, but immediately, due to their weight, settle by gravity. Reinforcing materials such as asbestos or fiber glass may be used in conjunction with the fine-grained aggregates to produce more durable coatings.

The emulsion added to the aggregate constitutes about 10 to 40% of the resultant slurry. The emulsion contains bitumen, water, emulsifier and one or more modifiers.

Pigmented slurries may be produced utilizing emulsions of resins which produce slurry compositions of light color. A petroleum resin is suitable for pigmentation with various colored pigments. The colored emulsion can then be combined with many native light colored aggregates such as limestone, silica and quartz aggregates to produce various colored coatings, especially suitable for pavement delineation. Emulsions using combinations of petroleum resins or coumarone-indene with synthetic resins such as acrylics, phenolics, polyethylene, polyesters, polypropylene, polyvinyl chloride, polyvinyl acetate and alkyds are suitable. Especially suitable compositions may be formulated using petroleum resins with acrylics or phenolic synthetic resins. It is suitable to use from 5 to 20 weight percent of the synthetic resin, based upon the total resin. Pigments may be added to the emulsion or to the slurry mixture to produce desired colorations, the amount of pigment being determined by the intensity of color desired. I have found that from 0.3 weight percent to 6.5 weight percent based upon the weight of the total emulsion may be used. Suitable pigments include titanium dioxide, chrome yellow, cadmium yellow, zinc yellow, benzidine yellow, chrome orange, molybdate orange, mercadmium orange, carmium orange, chrome green, chrome oxides, phthalocyanine green, iron blue, phthalocyanine blue, violet molybdate, mercadium red and maroon, toluidine red, red iron oxide and fluorescence pigments. The above pigments may be blended in various proportions to result in desired shades of colors. It is preferred to utilize pigments which are predispersed in water or light oil.

The following examples are presented to illustrate the present invention.

EXAMPLE I

A water-washed fine gravel aggregate, such as an aggregate having the following particle size distribution.

Mesh: | Percent
--- | ---
−8 +20 | 15.4
−20 +40 | 17.0
−40 +50 | 20.1
−50 +100 | 30.1
−100 +140 | 7.4
−140 +200 | 3.3
−200 | 6.7 is first well mixed to assure a uniform blend and then thoroughly wetted with water (10% water based on the weight of the dry aggregate).

A bituminous emulsion (15% by weight based on the dry aggregate) having the following composition is then blended into the wetted aggregate to form a slurry.

Emulsion:
    65% asphalt (85–100 penetration)
    35% water
    1.0% N-tallow, N,N-dimethyl N',N',N'-trimethyl 1, 3-propylene diammonium chloride
    0.5% oleyl amide polyethoxylated with 5 moles of ethylene oxide.

In the above emulsion formulation, the percentages of the emulsifier and modifier is based upon the asphalt and water as 100%.

Blending is carried out by slow mixing in a type of ribbon blender. Overmixing is avoided.

If there is any stiffening or drag of the slurry, additional water is immediately added. Or if water separates from the slurry, an electrolyte such as alum, aluminium hydroxide, aluminum chloride, ferric chloride, calcium phosphate, chromium chloride or phosphoric acid is added.

After formation of the slurry, the surface to be coated is checked and patched where necessary to provide a smooth underbed. The slurry is then applied via a spreader box, such as those usually pulled behind a transit mixing device. As the box is dragged along the surface, the slurry is usually spread with a rubber doctor blade to a thickness between 1/16 and 1/4 inch. It is preferred that the temperature of application exceed 40° F.

Such a slurry coat after drying will be found to be uniform and possess good weight-load characteristics.

EXAMPLE II

Using a fine gravel aggregate similar to the one described in Example I and following a similar procedure, the following additional formulations may be used.

Formulation A

60% asphalt
40% water
1.0% tallow trimethyl ammonium chloride
0.1% calcium chloride

Formulation B

60% asphalt
40% water
1.0% tallow trimethyl ammonium chloride
0.2% polyoxyethylene oleyl amide containing 5 moles ethylene oxide
0.1% calcium chloride

Formulation C

60% asphalt
40% water
0.5% N-tallow N,N-dimethyl N',N',N'-trimethyl 1,3, propylene diammonium chloride
0.5% alkylphenoxy polyoxyethylene ethanol (Igepal CO-720)

In the above formulations, the percentages of the emulsifiers and modifiers are based on the asphalt and water as 100%.

The emulsions may be formed by known procedures. For example, the water for the emulsion may be introduced into a tank and heated to approximately 120° F. The water soluble quaternary is then mixed with the water. The heated aqueous solution of the emulsifier is then pumped to a colloid mill and injected simultaneously with the molten asphalt. The finished emulsions are pumped from the colloid mill to storage.

EXAMPLE III

A water-washed sand aggregate such as an aggregate having the following gradation analysis.

| Mesh: | Percent |
|---|---|
| —4 +8 | 8.6 |
| —8 +14 | 23.4 |
| —14 +20 | 25.4 |
| —20 +40 | 15.1 |
| —40 +50 | 4.9 |
| —50 +100 | 11.3 |
| —100 | 11.5 | is charged into the mixing chamber of a wet mix pneumatic device and is mixed to insure uniformity of distribution of the fine particles. It is then wetted with water (10% water based on the dry weight of the aggregate) and mixed again to insure uniform wetness.

A quaternary cationic emulsion as shown in Example II (25% by weight based on the dry weight of the aggregate) is then added to the wetted aggregate while the mixer is in motion to form a shootable slurry.

The mixing chamber is then sealed and with proper manipulation of check valves, compressed air is introduced into the slurry which carries the slurry through 25 feet to 75 feet of hose to a nozzle. Additional compressed air is introduced into the slurry at the nozzle, with a blast effect, which carries the slurry to the surface to be coated with considerable force. The air carried slurry, at impact, builds up to as thick a layer as is deemed necessary because of the coherent nature of the emulsion coated said particles have for each other. While a high degree of densification or compaction is obtained by virtue of the force of application, any thickness desired of the applied material can be obtained by simply moving the nozzle more slowly or more rapidly over any one area.

EXAMPLE IV

In similar fashion to Example II, other slurries were made having the following ingredients and concentrations.

Formulation A

Aggregate (83% by weight):
  Lake Michigan Beach Sand
Emulsion (17% by weight):
  65% asphalt
  35% water
  0.25% nonyl phenoxy poly(ethyleneoxy) ethanol (30 moles of ethylene oxide)
  0.75% tallow trimethyl ammonium chloride

Formulation B

Aggregate (90% by weight):
  Salt River, Arizona Mortar Sand
Emulsion (20% by weight):
  65% asphalt
  35% water
  0.5% N-tallow N,N-dimethyl N',N',N'-trimethyl 1,3 propylene diammonium chloride
  0.5% nonyl phenoxy poly (ethyleneoxy) ethanol (30 moles of ethylene oxide)

Formulation C

Aggregate (83% by weight):
  Silica gravel of a size gradation from 100% passing a No. 4 sieve to finer than 200 mesh
Emulsion (17% by weight):
  65% asphalt (American Bitumul)
  35% water
  0.5% tallow trimethyl ammonium chloride
  0.1% $H_3PO_4$
  0.1% $CaCl_2$

Formulation D

Aggregate (83% by weight):
  Lake Michigan Beach Sand
Emulsion (17% by weight):
  65% asphalt
  35% water
  1.0% Tallow trimethyl ammonium chloride
  0.5% rosin acid ester ethoxylated with 15 moles of ethylene oxide

Formulation E

Aggregate (83% by weight):
  Lake Michigan Beach Sand
Emulsion (17% by weight):
  65% asphalt
  35% water
  1.0% tallow trimethyl ammonium chloride
  1.0% hydrogenated tallow amide ethoxylated with 50 moles of ethylene oxide

Formulation F

Aggregate (83% by weight):
  Lake Michigan Beach Sand
Emulsion (17% by weight):
  65% asphalt
  35% water
  1.0% tallow trimethyl ammonium chloride
  1.0% oleic acid polyethoxylated with 10 moles of ethylene oxide.

Formulation G

Aggregate (60% by weight—dry):
 Sand wetted with 20% water
Emulsion (40% by weight)
 65% asphalt (85–100 penetration)
 35% water
 1.0% tallow trimethyl ammonium chloride
 0.2% oleyl amide polyethoxylated with 5 moles of ethylene oxide
 0.1% $CaCl_2$

Formulation H

Aggregate (60% by weight):
 Siliceous sand wetted with 20% water
Emulsion (40% by weight):
 65% asphalt (85–100 penetration)
 35% water
 1.0% tallow trimethyl ammonium chloride
 0.1% $CaCl_2$
 0.05% $Ca_3(PO_4)_2$

Formulation I

Aggregate (78.7% by weight):
 76.4% mortar sand—100% passing #16 sieve
 2.3% portland cement
 Wetted with 7.6% water
Emulsion (21.3% by weight):
 60% asphalt (85–100 penetration)
 40% water
 0.75% N-tallow trimethylene diammonium dichloride ethoxylated with 3 moles ethylene oxide per mole diquaternary ammonium compound.

In the above formulations, the percentages of emulsifiers and modifiers are based upon the asphalt and water as 100%.

EXAMPLE V

A pigmented slurry seal composition was prepared having the following formulation:

Aggregate (78% by weight):
 68% silica sand—35 mesh
 3% limestone dust
 3% asbestos fiber (asbestos floats obtained from Johns-Manville Company under the designation 7TF1—100% passing 10 mesh screen)
 4% titanium dioxide
 0.1% N,N,N',N',N'-pentamethyl-N-tallow trimethylene diammonium dichloride
 Wetted with 4.9% water containing 10% aluminum chloride
Emulsion (17% by weight):
 60% hydrocarbon petroleum resin (Panorez Resin obtained from Amoco Chemical Co.)
 40% water
 0.75% N,N,N',N',N'-pentamethyl-N-tallow trimethylene diammonium dichloride.

The above slurry mix was formulated and resulted in a highly reflectant white composition which could be applied as a white surfacing material or pigmented to various colors.

0.1%, on basis of total slurry, of pre-dispersed red and yellow pigments were added to different portions of the white slurry mix and resulted in vivid highly visible colored coatings. Such slurry compositions are extremely satisfactory for use for pavement delineation, providing superior adhesion properties.

While in the foregoing specification this invention has been described in relation to certain specific embodiments thereof and many details have been set forth for purposes of illustration, it will be apparent to those skilled in the art that the invention is susceptible to additional embodiments besides those specifically set forth herein, and that many of the details may be varied considerably without departing from the basic principles of the invention.

I claim:

1. An asphalt aggregate slurry composition capable of being worked, comprising; about 50 to 80 weight percent of said composition of a mixture of a fine-grained aggregate, at least 80% by weight of said aggregate passing through an 8 mesh screen; about 10 to 40 weight percent of said composition of an aqueous asphaltic emulsion of oil-in-water type, said emulsion comprising 50 to 70 weight percent asphalt, based on said emulsion, 30 to 50 weight percent water, based on said emulsion, and about 0.5 to 1.5 weight percent based on said emulsion, of N-tallow N,N,N',N',N'-pentamethyl 1,3-propylene diammonium dichloride emulsifier for the asphalt; and water; said slurry having a continuous water phase with the particles of said fine-grained aggregate and the particles of said emulsified asphalt being dispersed therein.

References Cited

UNITED STATES PATENTS

| | | | |
|---|---|---|---|
| 3,689,297 | 9/1972 | Dybalski et al. | 106—280 |
| 3,689,298 | 9/1972 | Dybalski et al. | 106—280 |
| 3,046,149 | 7/1962 | Moore et al. | 106—273 N |
| 3,050,468 | 8/1962 | Wright | 106—277 X |
| 3,126,350 | 3/1964 | Borgfeldt | 106—277 X |
| 3,220,953 | 11/1965 | Borgfeldt | 106—277 X |
| 3,236,671 | 2/1966 | Dybalski et al. | 106—277 |
| 3,276,887 | 10/1966 | Pitchford | 106—277 X |
| 3,359,738 | 12/1967 | Dybalski et al. | 106—277 X |
| 3,432,320 | 3/1969 | Pitchford | 106—277 |
| 3,422,026 | 1/1969 | Wright | 106—277 X |

FOREIGN PATENTS

| | | | |
|---|---|---|---|
| 645,098 | 7/1962 | Canada | 106—277 |

JOAN B. EVANS, Primary Examiner

U.S. Cl. X.R.

106—283; 252—311.5